United States Patent
Buckingham

(12)
(10) Patent No.: US 6,269,309 B1
(45) Date of Patent: Jul. 31, 2001

(54) SYSTEM FOR COLLECTION DISSEMINATION AND PRESENTATION OF NEAR REAL-TIME IMAGES OF WEATHER AND RUNWAY CONDITIONS AT DISTANT LOCATIONS

(76) Inventor: James M. Buckingham, 6958 No Name La., Fairbanks, AK (US) 99712

(*) Notice: Subject to any disclaimer, the term of this patent is extended or adjusted under 35 U.S.C. 154(b) by 0 days.

(21) Appl. No.: 09/482,827

(22) Filed: Jan. 12, 2000

(51) Int. Cl.[7] .............................................. G06F 169/00
(52) U.S. Cl. ................................................................ 702/3
(58) Field of Search .............................. 702/3, 4; 342/26

(56) References Cited

U.S. PATENT DOCUMENTS

| | | | |
|---|---|---|---|
| 5,473,737 | * 12/1995 | Harper | 345/431 |
| 5,654,886 | * 8/1997 | Zereski, Jr. et al. | 702/3 |
| 5,848,378 | * 12/1998 | Shelton et al. | 702/3 |
| 5,999,882 | * 12/1999 | Simpson et al. | 702/3 |
| 6,085,152 | * 7/2000 | Doerfel | 702/3 |

* cited by examiner

*Primary Examiner*—Donald E. McElheny, Jr.
(74) *Attorney, Agent, or Firm*—Michael Tavella

(57) ABSTRACT

A data collection and display system that displays near real-time images of distant weather and runway conditions to pilots and other end users to be used in flight planning and execution. The system uses cameras and hardware at the distant location, which regularly transmit still video images of the sky, horizon and runways (if at an airport) to an Internet Service Provider. The images are then accessed by a web site and presented to the user to assist with flight planning. Each current image is juxtaposed on the computer monitor against a "clear-day" image that shows conditions as they appear when there are no weather related obstructions to vision. The current image may then be compared to the "clear-day" image to assist the user in ascertaining both quantitative and qualitative information about the weather and runway conditions at the site in question.

23 Claims, 8 Drawing Sheets

SYSTEM FOR COLLECTION DISSEMINATION AND PRESENTATION OF NEAR REAL-TIME IMAGES OF WEATHER AND RUNWAY CONDITIONS AT DISTANT LOCATIONS

CROSS REFERENCE TO RELATED APPLICATIONS

Not Applicable

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the obligations under his service in the U.S. Army.

BACKGROUND OF THE INVENTION

1. Field of the Invention

This invention relates to information collection and reporting systems for reporting real-time weather and runway condition information, and particularly to information that is obtained through the use of visual images of the sky, horizon and terrain transmitted from a distant location to a hub location wherein the images can be accessed by all interested users.

2. Description of Related Art

For convenience, the following abbreviations and acronyms are defined here:

ASOS—Automated Surface Observing System

AWOS—Automated Weather Observing System

Clear-Day Image—Image of a particular view which has been captured on a day free of weather obstructions to vision and is annotated with written and graphic information about objects in the image.

Current Image—Image of a particular view no more than 30 minutes old

FAA—Federal Aviation Administration

Image—The visual product produced on a computer monitor

ISP—Internet Service Provider

NWS—National Weather Servicezx

View—The visual extent of coverage, top to bottom and left to right of the camera which is collecting the image Since the beginning of air travel, pilots have had to deal with the weather. Bad weather may prevent pilots from approaching and landing at airports. Today, pilots get preflight and in-flight weather information to help them anticipate weather conditions they may encounter along their route of flight. Some airports have navigation aids, communications facilities and weather reporting systems to assist pilots in dealing with the weather.

The situation is not as good, however, for hundreds of other airports and landing fields throughout the world. For these locations, a pilot may get a regional briefing or a pilot report at best. Often, pilots arrive at an airport only to find it is "weathered in" and the pilot cannot land. This increases risk and may result in accidents or emergencies. It also results in inefficiencies and lost revenue for commercial air carriers.

To solve this problem, many weather observation resources have been developed. A human observer is an excellent source of weather information. He may be under contract with the FAA, NWS or a third party contractor that provides information to federal agencies. However, cuts in government budgets have encouraged a move away from human observers to automated systems.

Another type of observation system is the automated weather observing system (AWOS) or automated surface observing system (ASOS), which are in use by both the FAA and the NWS. They are an excellent source of information for wind speed, wind direction, temperature, dew point and altimeter setting. They are weak in their collection of visibility and ceiling data. For example, they provide no information about sky conditions in any of the cardinal directions (north, south, west or east). While an overcast ceiling directly above the airport may discourage a pilot from attempting a flight to that location, it is completely plausible to have poor conditions directly over the airport, but clearing or completely clear conditions to the north or south. Thus, they are limited in the extent to which they provide useful information about the complete celestial dome. In addition, the sensors that determine ceiling often do not operate properly in some weather phenomenon. Low temperatures, ice fog, haze and other anomalies often cause these systems to erroneously report that conditions do not support VFR flight when in fact they do.

The second problem with these systems relates to visibility. Automated systems use an emitter and sensor in close proximity to one another (several feet) to measure reflected light scattered by the atmosphere. Algorithms use the amount of reflected light to extrapolate over a large distance and establish a measure of visibility in miles. This system is also flawed in two ways. First, it only measures local visibility at the point of the instrument. To the extent that the microclimate at the point of the instrument is applicable to the area surrounding the airport for 15 miles, it may accurately state the prevailing visibility. This is often a poor assumption. Secondly, the automated systems extrapolate over a distance of 3 feet to distances measured in miles. Variations in weather, as well as smoke, haze, blowing dust, local fog, idling engines, chimney smoke, etc. confuse the sensors and may produce a completely inaccurate representation of current conditions.

The next type of weather aid is satellite imagery. These products provide both visible spectrum and infrared images of the weather from space. While they provide excellent information about the presence of major cloud layers or the lack thereof, they provide no information about the actual conditions beneath a broken or overcast layer of clouds. Therefore, once they establish that the sky is overcast at a particular location, they cannot discern the ceiling, the type of layers, the number of layers or other information that is helpful to a VFR pilot.

Another weather aid is NEXRAD radar. Radar helps immensely in establishing the density of cloud buildups and the amount of precipitation or water vapor within the region. While they detect the presence of very bad flying conditions due to heavy precipitation, or impaired flying conditions due to light precipitation NEXRAD does not positively identify areas where the ceiling or visibility is such that it is conducive to VFR flight.

BRIEF SUMMARY OF THE INVENTION

The instant invention overcomes all these problems. It uses systems to transfer live images from distant locations to an Internet service provider (ISP) that provides the public with access to those images through an Internet website. The invention is used to display images of the sky, horizon and runway environment from distant airports or aviation critical locations (e.g., mountain passes, coastlines, rivers etc.) and to display these images at regular intervals on a website. To further enhance this information, the image is displayed on the same screen with an annotated, clear-day image of the same view.

The juxtaposition of the current and the clear-day images allows the user to glean important information about the current weather and runway conditions at distant locations to be used as part of his flight planning. Without the clear-day image, a user has no clear understanding of what the surrounding terrain, horizon or airport environment should look like when there is unlimited visibility and unlimited ceiling. The system provides information that is more intuitive, more complete and more accurate that existing systems, and which may be used to corroborate the accuracy of existing automated systems.

DETAILED DESCRIPTION OF THE INVENTION

The instant invention uses four modules: Image collection, image transfer, image dissemination, and image presentation. Each of the modules is described below.

Figure 1:
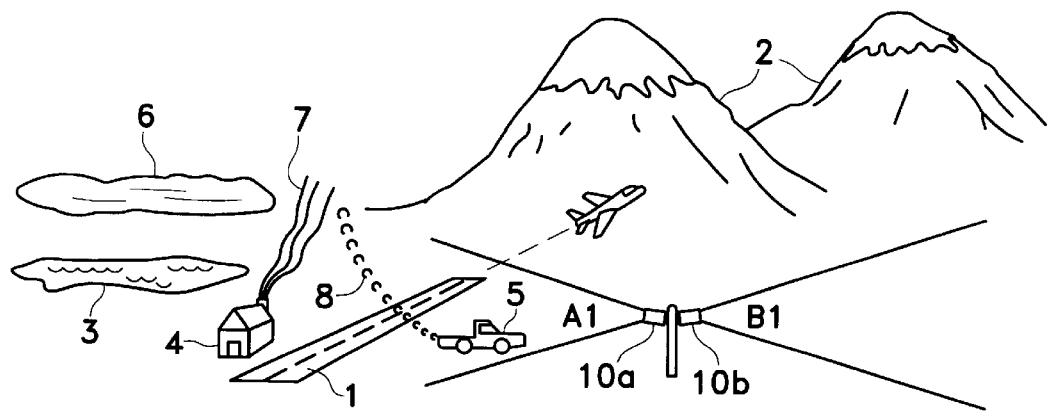
FIG. 1 is a detail view of a typical rural airport.

Referring now to FIG. 1, the image collection hardware is located at the site at which weather and runway information is to be determined. In the preferred embodiment, the image collection system has from 1 to 5 cameras at any particular site. This number may be increased as the need arises. Note that wherever the word camera is used, it refers to any type of image collecting device, including video cameras, digital cameras, infrared cameras, and any similar type of equipment that can capture an image for transmission.

Normally the cameras are mounted on an existing structure (building, AWOS), although they may be mounted on their own integral structure (a pole for example). The cameras are pointed in the direction that provides the most information to the user for the particular site. The camera directions are determined based on the following criteria: distance from the camera to the runway; orientation of runway from camera (perpendicular or oblique); cardinal direction to the runway; visible length of runway from the camera; the location of the predominant terrain on the horizon; the line of sight from the camera to the terrain; and the normal direction of approach that pilots take into airport or through the site, e.g., a mountain pass. A site survey is normally done to gather the information needed to make the final siting decisions. FIG. 1 shows typical site details. A runway 1 is shown surrounded by mountains 2, a lake 3, a building 4 and a fog bank 6 each of which may be viewed by the cameras. The building 4 produces smoke 7 and the vehicle 5 produces exhaust 8, which can confuse existing automated sensors, but which may be clearly defined by the camera image.

At least one camera 10 is normally trained on the runway and its environment to capture runway condition. The balance of the cameras 10 are trained on the sky and horizon in up to three cardinal directions (assuming four cameras). Camera 10a looks toward the runway and produces a view A1. A second camera 10b looks in the opposite direction and produces a view B1.

Figure 2:
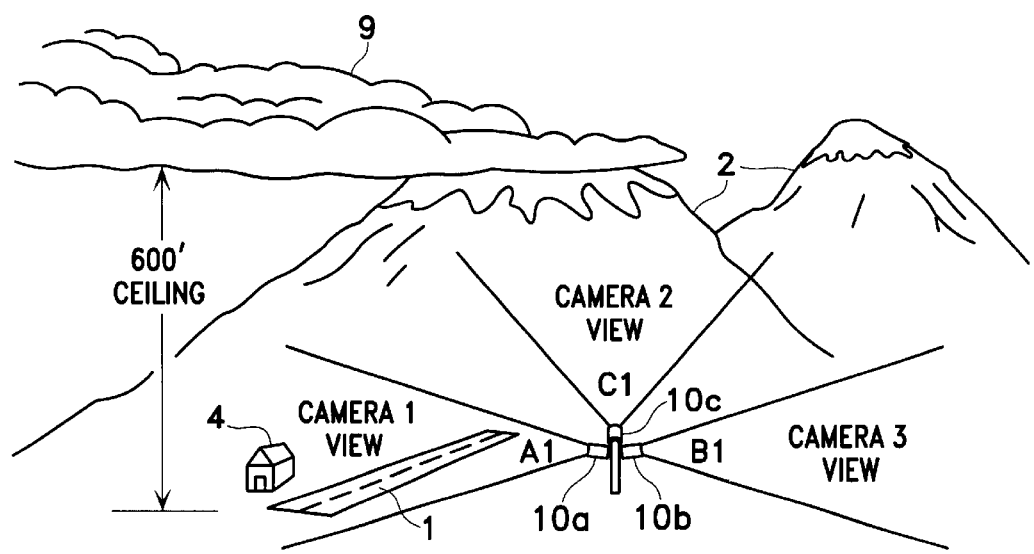
FIG. 2 is a detail view of a typical rural airport showing the camera locations and the camera's field of view, as part of the instant invention.

FIG. 2 shows a typical camera location and viewpoints. Here, three cameras 10a, 10b, and 10c produce camera views A1, B1, and C1 as shown. FIG. 2 also shows a cloud cover 9 producing a 600-foot ceiling as shown.

Figure 3:
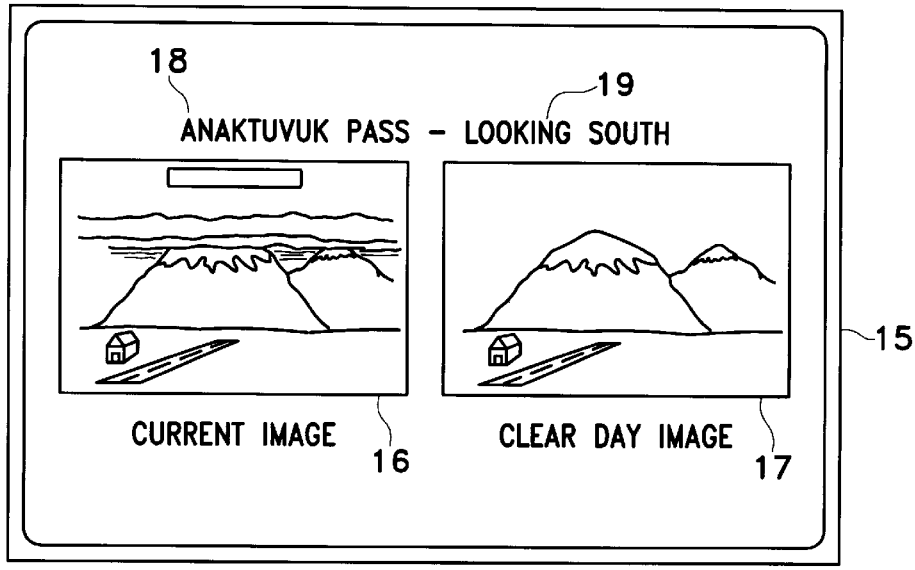
FIG. 3 is a view of a computer display showing both a current airport image and a contrasting clear-day image for comparison.

The cameras produce images of the site that are transmitted to a website. This website includes a screen display 15 that displays a current image 16 of the site simultaneously with a clear-day image 17. See FIG. 3. In the preferred embodiment, the images are side by side in order to allow the user to make direct comparisons between them. The images also are the same size and both encompass exactly the same view. FIG. 3 also shows some of the annotation details. The screen display 15 displays the location of the site 18 and the direction of view 19. Both the current image and clear day images are also labeled as shown.

Figure 4:
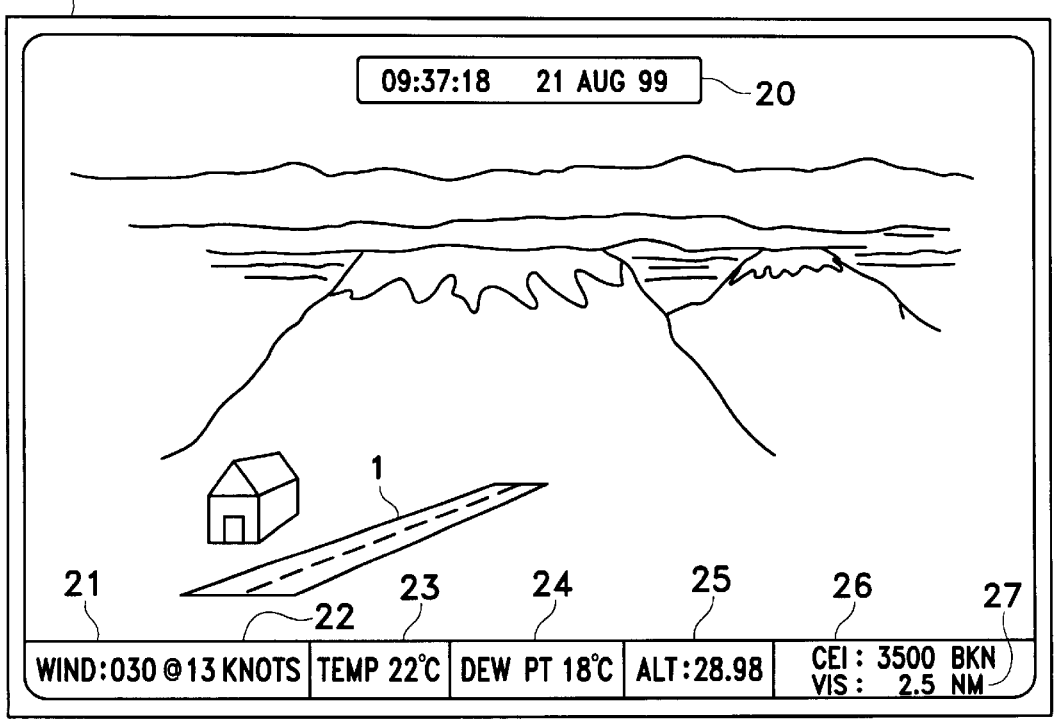
FIG. 4 is an enlarged view of a computer display showing a current image with weather information displayed.

FIG. 4 shows an enlarged view of the current image display 16. In the preferred embodiment, this screen 16 is annotated with the date and time at which the image was created 20. The current image 16 portrays automated weather information from locations where automated systems exist, including: wind direction in degrees 21, wind speed in knots 22, temperature 23, dew point 24, altimeter setting 25, measured ceiling 26, and measured visibility 27. FIG. 4 shows the preferred placement of these data. However, they can be displayed anywhere on the screen.

Figure 5:
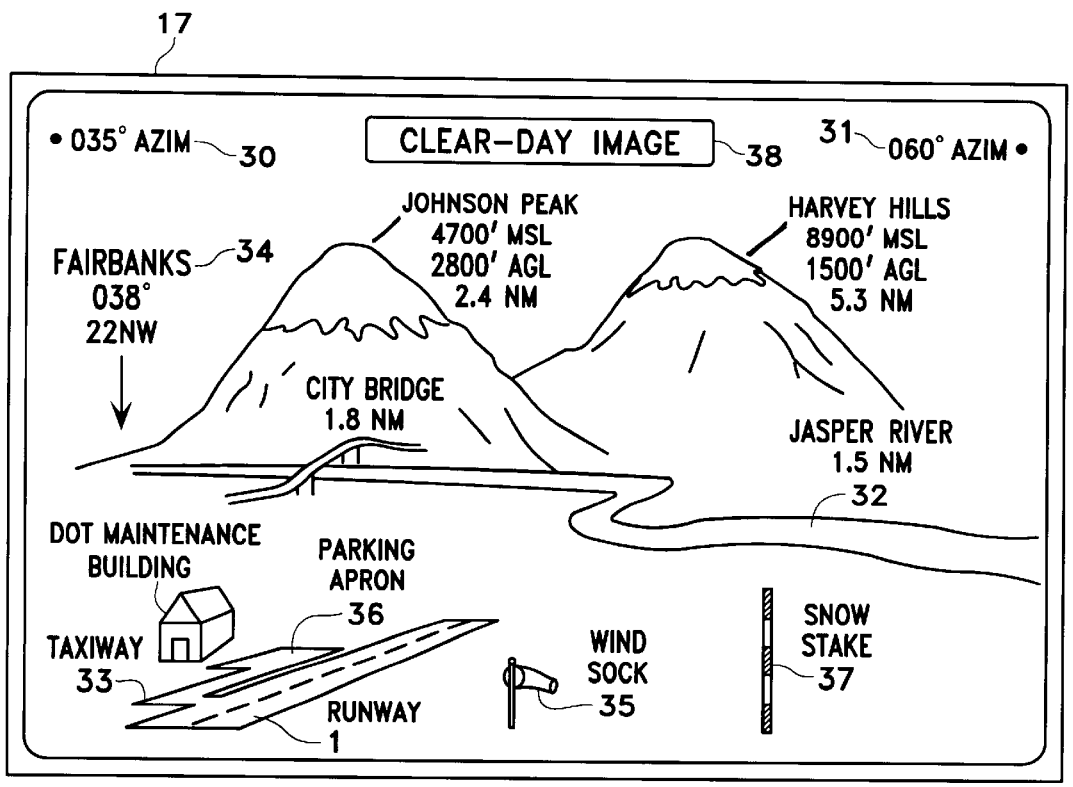
FIG. 5 is an enlarged display of a clear day image with geographic annotations.

FIG. 5 shows an enlarged view of the clear day image 17. In the preferred embodiment, the clear-day image is created on a day when there is unlimited cloud ceiling, unlimited visibility and such that the natural lighting provides a well-defined view of both the landscape and the sky. The clear-day image is consistent with the season of the year in which it is being viewed, i.e., a new clear-day image is produced each time major changes occur in the presentation of the terrain. Thus, the preferred embodiment includes one image for summer when vegetation is at its peak; one image for autumn when vegetation is dying, leaves are falling, but there is no snow cover on the ground; one image for winter when trees are bare and there is snow cover on the ground; and one image for spring when snow cover has melted and new vegetation is growing. These images may be adjusted for the geographical location and archived to eliminate the need to produce a new image every year (provided the images remain correct). The change in images may also be automated such that the website displays the appropriate view based on a given date.

In the preferred embodiment, the clear-day image is annotated with the following information: the magnetic azimuth at the left extreme of the image 30 corresponding to the magnetic direction aligned with the left side of the view; the magnetic azimuth at the right extreme of the image 31 corresponding to the magnetic direction aligned with the right side of the view; the mean sea level (MSL) altitudes of the peaks or other important features of prominent terrain on the horizon; the above ground level (AGL) altitudes of the peaks or other important features of prominent terrain on the horizon; the distance in statute miles, nautical miles or kilometers and the names of peaks or other important features of prominent terrain on the horizon such as mountains, rivers, hills, valleys, lakes or oceans 32. Also shown is a description of man-made structures in view in the image; the distance in statute miles, nautical miles or kilometers and the names of man-made structures in view in the image such as villages, cities, buildings, roads, highways or skylines. Also the magnetic direction and distance to important man-made (cities, villages) or naturally occurring (mountains, valleys) terrain features which are not in view in the image but which may be important to a pilot to discern particular weather patterns in his direction of flight.

Other important features in the image that may be of interest to a pilot are also highlighted. Some of these include: the windsock or windcone 35 at an airport; the extent of the runway 1 at an airport; the parking apron and taxiways 36 at an airport; and a snow stake 37 to indicate the depth of snow. Finally, the Clear-Day image is labeled 38 to distinguish it from the Current Image.

As noted above, labels are used to identify each of these features on the clear day image.

Figure 11:
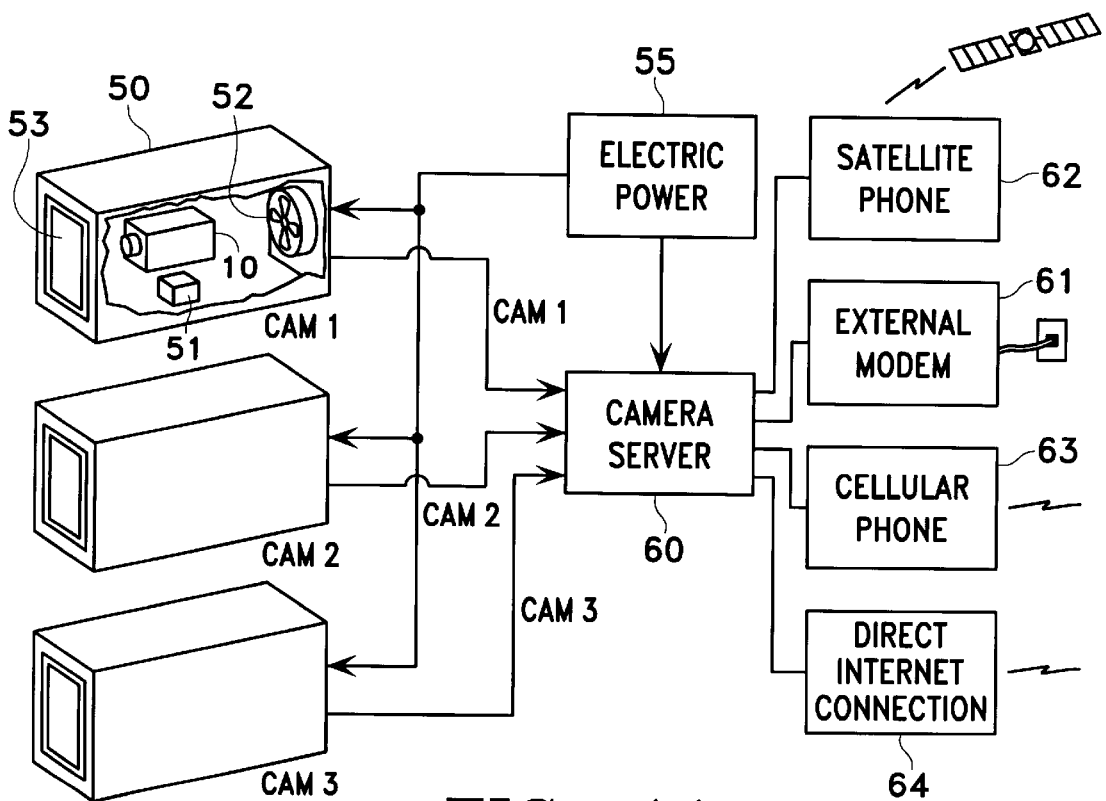
FIG. 11 is a block diagram of the main components of the invention.

The cameras 10 must be protected from the elements when installed in the field. FIG. 11 shows that each camera 10 is enclosed inside of an environmental housing 50 that provides protection from the wind, moisture, dust, pests and other natural phenomena that could endanger the integrity of the camera hardware. The housing is typically a pre-manufactured unit, such as those is manufactured by Pelco Company, 300 E. Pontiac Way, Clovis Calif. 93612. The environmental housing is thermostatically controlled, providing heat 51 when the internal temperature drops below a predetermined level, and activating a fan 52 to circulate air when the internal temperature rises above a predetermined level. The environmental housing has a window allowing the camera to see through the housing to the outside 53. The window is equipped with a thermostatically controlled defroster that activates to melt ice, or evaporate moisture off the window as needed. Each environmental housing requires electrical power 55 which can vary based on the specific application from 12 V D.C., to 24 V AC or DC, to 110 volts AC. The power to the housing powers the camera, heaters, fan and defroster.

FIG. 11 also shows a camera server 60. The cameras 10 are connected to the camera server 60 by means of RG-6 coaxial cable, or similar cable. The image from each camera is transmitted through this cable to the camera server 60. In the preferred embodiment, the camera server is an AXIS 240, manufactured by AXIS Communications, Inc., 100 Apollo Drive, Chelmsford Mass. 01824, which hosts up to 5 cameras in one box. The camera server is a piece of equipment which allows up to five video cameras to be hooked directly to any Ethernet network, intranet or the Internet, which then allows authorized users to monitor the sites from anywhere through a Web browser. The camera server also requires electric power.

Once the image is captured, it must be transmitted to the end user. FIG. 11 shows some methods of transferring the captured images. As shown, the images can be transmitted using an external modem 61, a satellite telephone 62, a cellular telephone 63 or a direct Internet connection 64. The choice of transmission hosts depends on the location, the transmission ability and the cost.

Once the images are collected and transmitted, they must be displayed. In one embodiment, images are displayed at a minimum interval of 30 minutes. That is, a new image is captured, transferred and displayed to users at least every 30 minutes. The choice of interval is based primarily upon operational cost. A smaller interval ensures a more timely image; one which is more useful to the end user. However, more frequent updates of the images require more frequent transmission, with the accompanying increased costs.

The images may take one of two routes from the camera site to reach the ISP where the images are made available to a website for public use. The two routes are either direct to the ISP, or to a hub computer first, then to the ISP.

Figure 12:
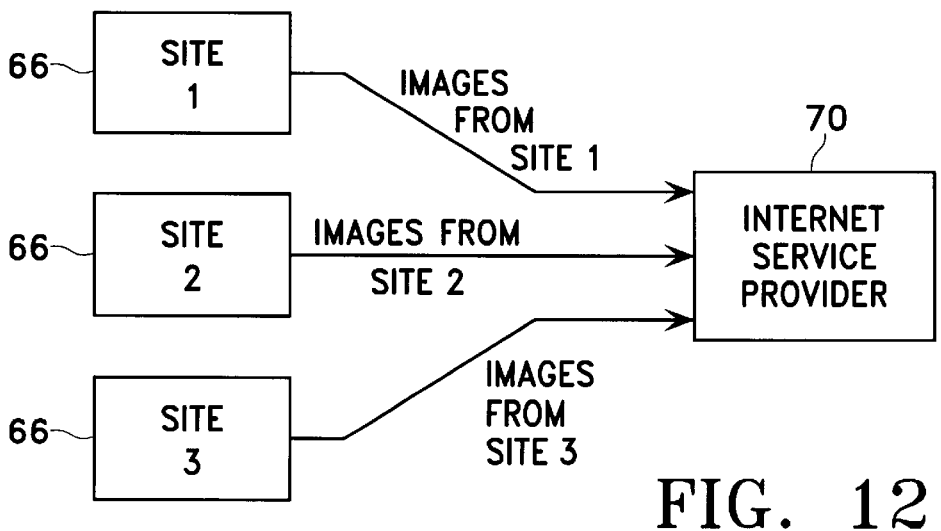
FIG. 12 shows a first type of communication path from various sites to an ISP.

FIG. 12 shows the direct-to-ISP system, the camera server 60 at each camera site 66 sends the images directly to the ISP 70, where they are stored and made available to the website. The automation required for this procedure is handled through internal programming of the camera server. The benefit of this arrangement is that one connection (call) is required to move the image from the camera site to the ISP. The disadvantage of this arrangement is that changes to the overall polling program must be communicated to each camera server independently. This can be accomplished from one location, but takes more time than the arrangement below. Users are also restricted to using only programming commands available on the camera server.

Figure 13:
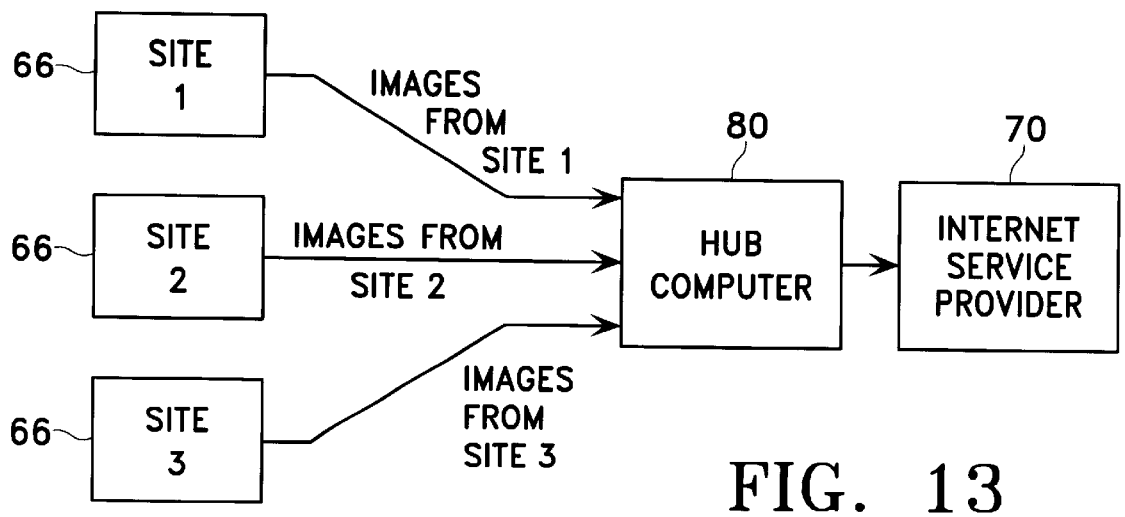
FIG. 13 shows a second type of communication path to an ISP.

FIG. 13 shows the first-to-a-hub-computer-then-to-the-ISP system. In this system, a hub computer 80 calls each individual camera site 66 and polls the camera server to provide images from that site. After images are downloaded from the site to the hub computer, the hub computer then terminates that call, dials the local ISP 70 and uploads the images to the ISP where they are made available to the website. The automation required for this procedure is handled through a computer program at the hub site, using ordinary programming techniques. The benefits of this configuration are that changes in the system may be made centrally on the hub computer that then applies the changes to all subsequent polling of cameras at remote sites. In addition, any programming language supporting communications protocols may be used to program the hub computer. The disadvantage of this arrangement is that two different connections (calls) are required to move the image from the camera location to the ISP.

Figure 10:
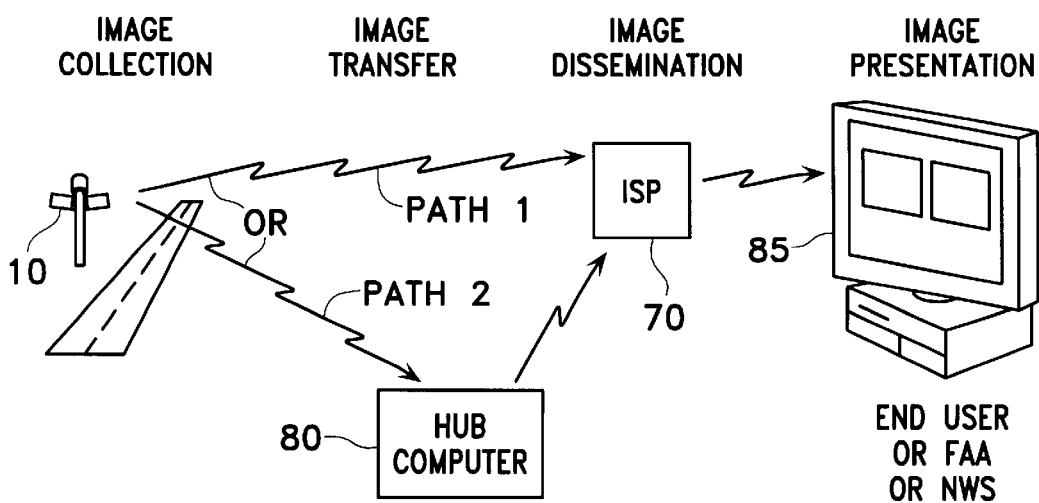
FIG. 10 shows the communications path for the images produced as part of the instant invention.

FIG. 10 shows the complete communication links for either of the systems just discussed. It also shows the four modules of the system: image collection; image transfer; image dissemination and image presentation. As shown in FIG. 10, the signals from the cameras can take one of two paths. That is either path 1 or path 2.

Figure 14:
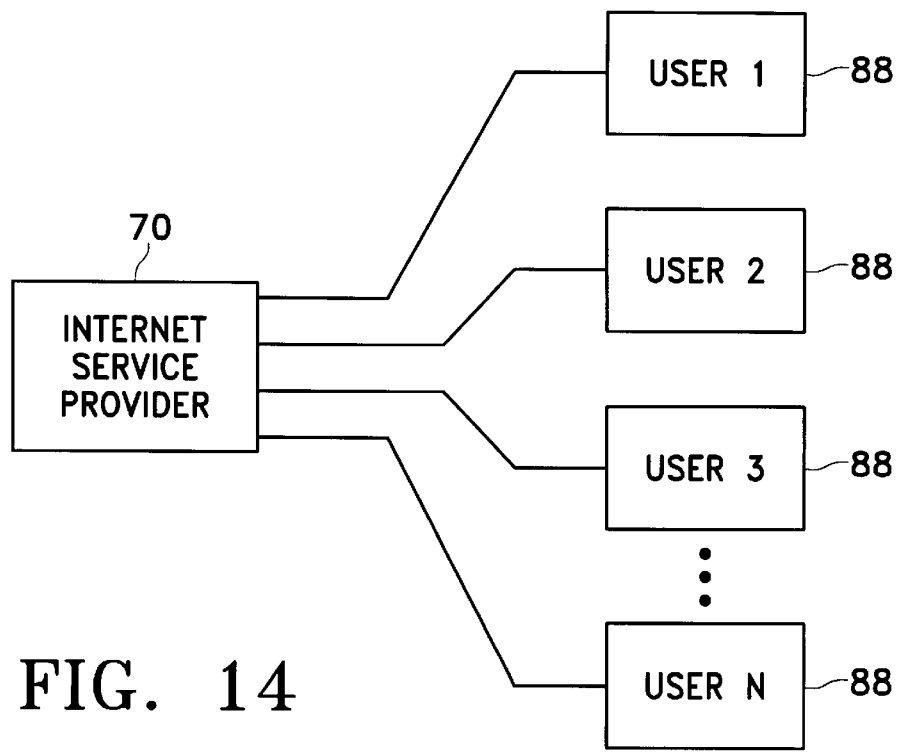
FIG. 14 shows a communication path from an ISP to end-users.

Once the images have successfully arrived at the ISP 70, they are made available to a website designed to host the current images and their clear-day equivalents. FIG. 14 shows this process. Once on a public website these images are accessible to all users/subscribers 88 to the website.

Figure 15:
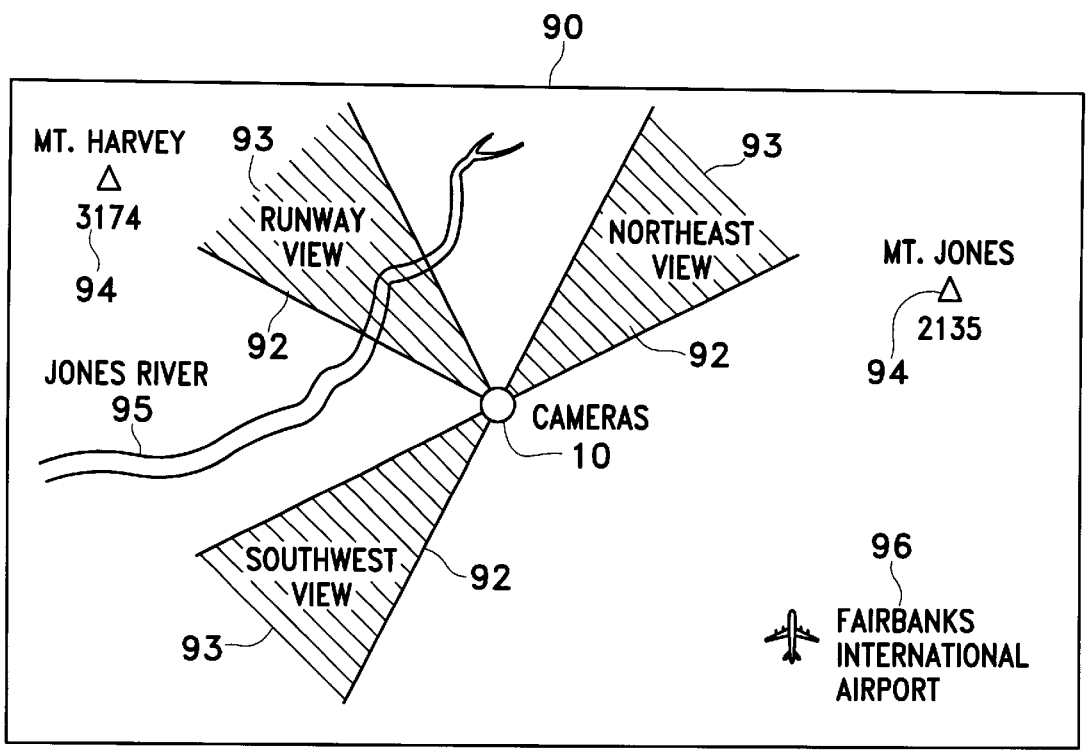
FIG. 15 is a display of an image showing an airport sectional map with the camera location and fields of view superimposed.

As noted above, the invention relates primarily to the presentation of data on the website to provide weather and runway condition information at distant locations. The information is provided via a clear-day image that is placed next to a current image on a computer monitor that is accessing the website. From the visual presentation, both quantitative and qualitative information can be gleaned about the current weather and runway conditions at the distant camera location. In the preferred embodiment, the website has a set of additional pages to achieve that end. One of these pages is an inset of a visual flight rules (VFR) sectional map 90. FIG. 15 shows this map. The map 90 includes a set of black lines 92 that show the left and right limits of the view of each of the cameras at a particular site. These lines give the user a visual understanding of the direction that each camera points in relation to the cardinal directions on a map. Up is north, down is south, left is west, right is east. The user may click (with a mouse or similar instrument) anywhere inside the boundaries of the pie-shaped wedges 93 bounded by the black lines, and the web site jumps down to the page that presents that specific camera's images. From this inset view, the user may select the set of images he wishes to view, which correspond directly with the view directions shown on the map. The map has the names and heights of important mountains 94, other terrain features, such as rivers 95, the location of the cameras 10, and the location of nearby major airports 96.

OPERATION

Figure 6:
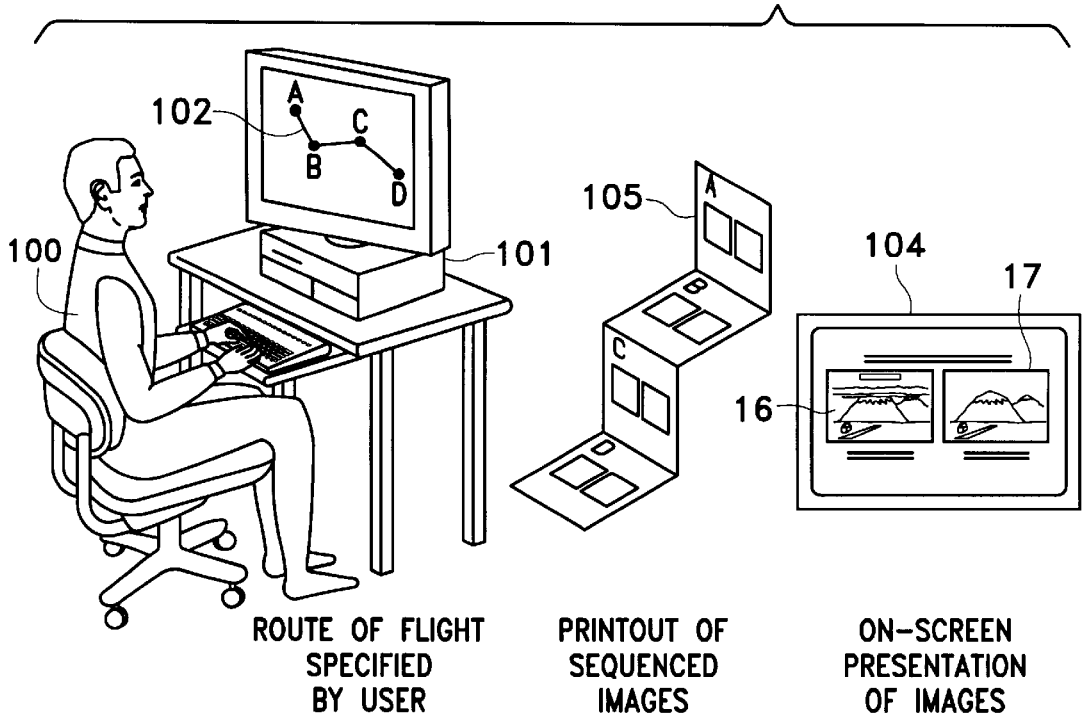
FIG. 6 is a view of a display showing a particular route selected by a pilot.
Figure 7:
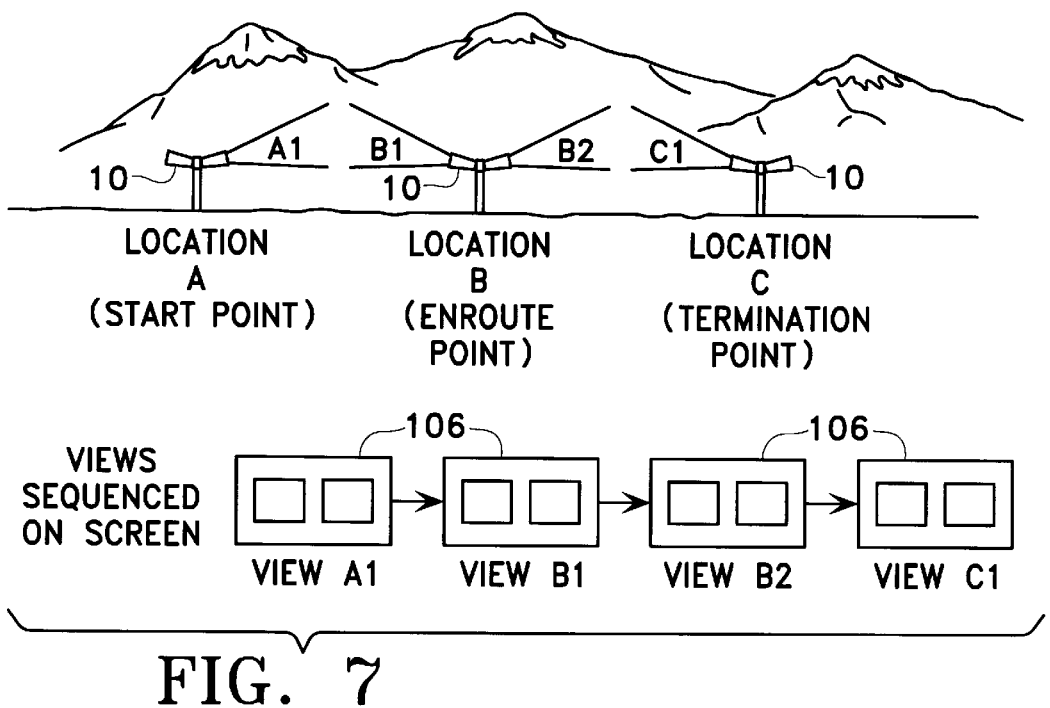
FIG. 7 is a view of a printout of images along the selected route for selected locations.
Figure 8:
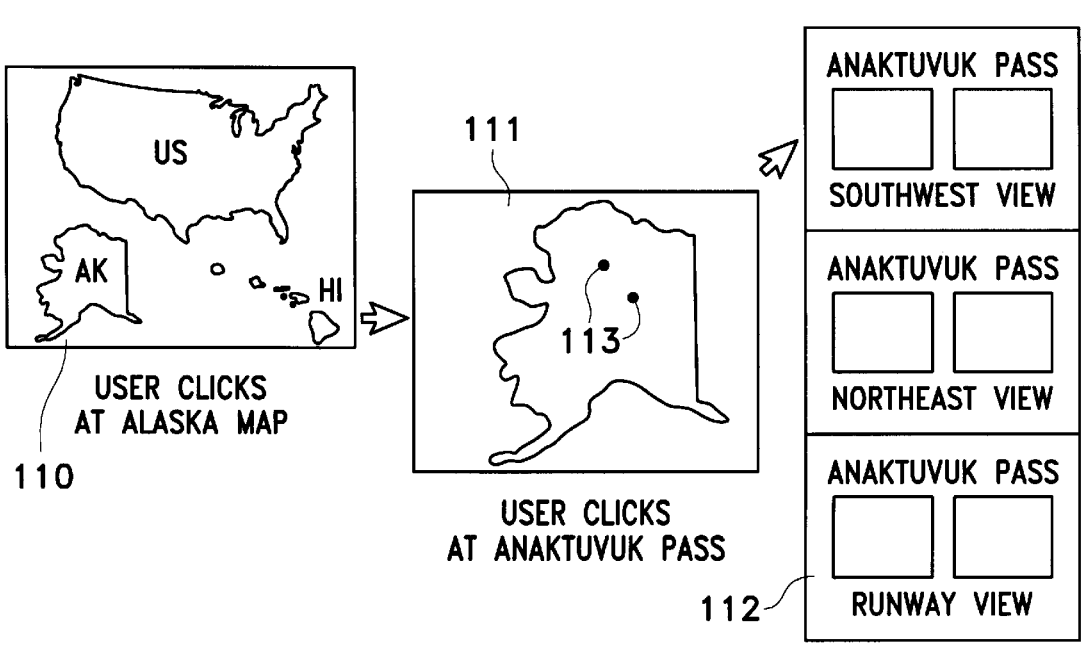
FIG. 8 is a sequence of computer displays showing a layered set of screens that display various selected locations in a stepped sequence.

In operation, the invention may be used in any of several ways. FIGS. 6–8 show some examples of these methods. In all cases, the user must have access to a monitor that is able to display graphic information. The user may be either in a fixed location, such as in a home or office, or in a mobile location, such as in an airplane. In either case, the user of the system follows these steps in accessing and using the images: first, the user connects to a system that provides access to the internet from a variety of sources, such as the user's personally owned hardware computer system; or over a hardware computer system owned and operated by a third party, such as the FAA in a pilot's lounge, for example; or the user accesses the images while airborne through a data link that provides current images of his intermediate or destination location. Next, the user accesses the website hosting the images using standard techniques in the art.

FIGS. 6 and 7 show the basic steps of checking conditions over a planned route. Here, the user specifies his departure location, specific routing and termination point. These specifications may be made by entering the airport name, or identifier. They may also be specified by clicking on a graphic map wherein the user clicks sequentially on each location of his routing. The system then sequences all available views of his departure point, en route locations within a certain distance of his direct route, and termination point information. These views are presented sequentially on the screen so that the user may look from location A toward location B, then from location B back toward location A, then from location B toward location C etc. all the way to the end of the route. FIG. 6 shows the user 100 uses a computer 101 to display a series of sites 102. The user then can obtain an onscreen presentation of the desired images for each site 104. If desired, the user can print out a set of sequenced images 105 for the user's convenience.

FIG. 7 shows a representation of this process. The figure shows cameras 10 at each site location as well as the views on a sequence of screens 106. Note that each screen shows the current image compared to the clear day image for each view from each site.

FIG. 8 shows another method for using the system. In this method, the user is shown an initial graphic map of the United States 110 with each state outlined and labeled. The user clicks on a state and is shown a graphic map 111 of that state with each camera location highlighted and labeled 113. Note that the displayed map has these locations labeled with their actual names, such as "Fairbanks" or "Anaktuvuk Pass". These names are not shown in the figure for clarity. The user clicks on a location and is shown all the current and clear-day images from that location 112.

Consistent with these methods, the user may also select any number of locations using the site name or identifier and the system provides the current and clear-day images from those locations to him for examination. Once the user has reached the desired location, the user selects a camera view for the current site. If a routing option has been selected, these views may be automatically sequenced for the user. The user then views the monitor with the current image juxtaposed against the clear-day image. The user then makes use of all the specific aspects of the current and clear-day images as described above to discern weather and runway condition appropriate to the site in question. Finally, the user uses the information to assist in flight planning, scheduling and decision-making.

Figure 9:
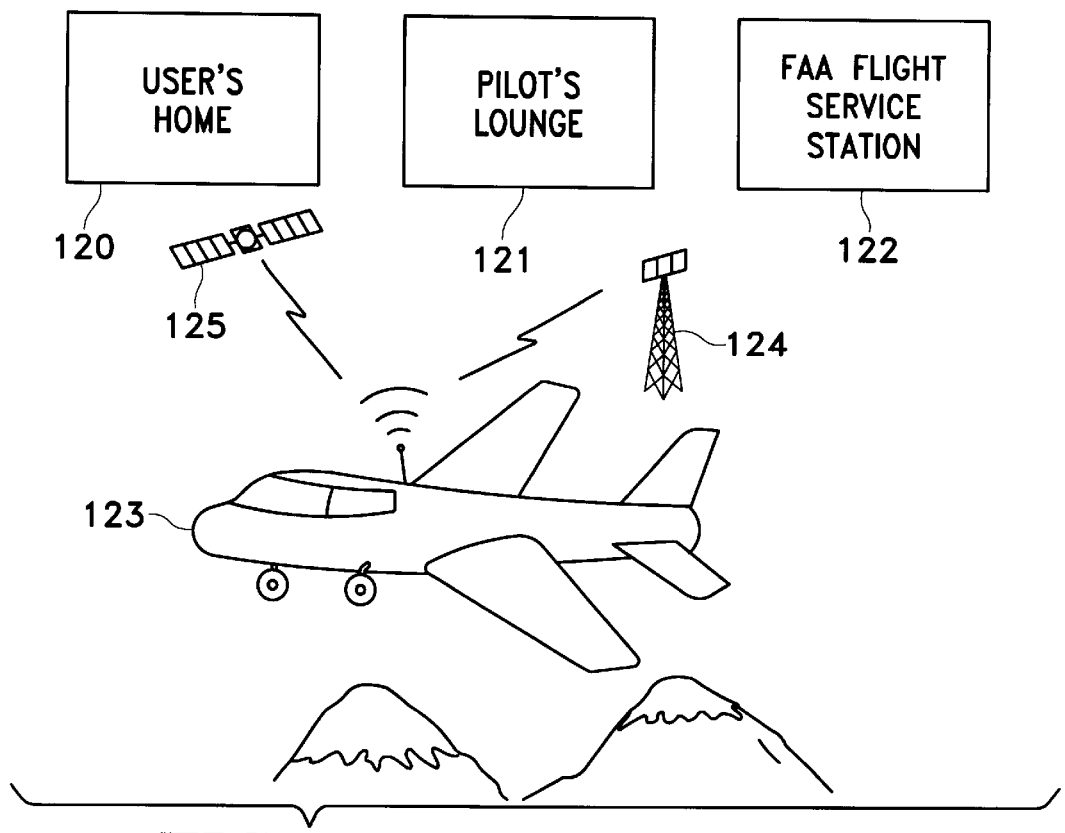
FIG. 9 shows representations of where a user of the invention may gain access to it, such as a home, airplane, or FAA facility.

FIG. 9 is an illustration of the variety of ways this information can be obtained. The website can be reached from the user's home 120, a pilots lounge 121, an FAA flight service station 122, or on an airplane 123, using either ground-based communications 124 or satellite links 125.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A system for obtaining and displaying site information comprising:
    a) a means for obtaining a stream of images from at least one location;
    b) a means for transmitting said stream of images to an internet website host;
    c) a website, having at least one information page, wherein said information page having a first display and a second display;
    d) wherein said first display displays said stream of images of said at least one location; and
    e) wherein said second display simultaneously displays a fixed image of said at least one location, said fixed image being taken on a clear day at said at least one location, with said stream of current-time images on said first display.

2. The system of claim 1 wherein said means for obtaining a stream of images includes a video camera.

3. The system of claim 1 wherein the means of transmitting said stream of images to an internet website host includes a transmission device selected from the group of: an external modem, a satellite telephone, a cellular telephone or a direct Internet connection.

4. The system of claim 1, wherein said website further includes:
   a) a home page displaying a list of remote locations;
   b) a means for selecting a particular remote location from said list;
   c) a plurality of information pages, wherein each of said plurality of information pages having a first display and a second display;
   d) wherein said first display displays said stream of images of said particular remote location from said list; and
   e) wherein said second display simultaneously displays a fixed image of said particular remote location, said fixed image being taken on a clear day at said particular remote location, with said stream of images on said first display.

5. The system of claim 4 wherein each particular location on said list of remote locations lies on a direct-route path from a beginning location to a destination location, such that a user can display an entire route in sequence on said plurality of information pages from the beginning location to said destination location.

6. The system of claim 1 wherein said stream of images has a plurality of annotations displayed simultaneously with said stream of images.

7. The system of claim 6 wherein said plurality of annotations includes:
   a) the date and time at which the stream of images were created;
   b) wind direction in degrees;
   c) wind speed in knots;
   d) temperature;
   e) dew point;
   f) altimeter setting;
   g) measured ceiling; and
   h) measured visibility.

8. The system of claim 1 wherein said fixed image has a plurality of annotations displayed on said fixed image.

9. The system of claim 8 wherein said plurality of annotations includes:
   a) a magnetic azimuth corresponding to a magnetic direction aligned with a left side of the image;
   b) a magnetic azimuth corresponding to a magnetic direction aligned with a right side of the image;
   c) mean sea level elevations of geographical features on a horizon;
   d) above ground level elevations of geographical features on the horizon;
   e) a distance from said geographical features from said means for obtaining a stream of images; and
   f) names of said geographical features on the horizon.

10. The system of claim 9 wherein said plurality of annotations further includes:
   a) a description of man-made structures shown in the fixed image;
   b) a distance from said man-made structures to said means for obtaining a stream of images;
   c) names of said man-made structures;
   e) a magnetic bearing and distance to man-made cities; and
   f) a plurality of magnetic bearing and distance geographical features that are not in view in the fixed image.

11. The system of claim 10 wherein said plurality of annotations further include:
   a) a windsock at an airport;
   b) an extent of a runway at an airport;
   c) a parking apron and taxiways at an airport; and
   d) a snow stake to indicate a depth of snow at an airport.

12. A method of obtaining and displaying site information comprising the steps of:
   a) placing a means for producing a stream of images, at a location;
   b) connecting said means for producing a stream of images to a means for transmitting said stream of images to an internet website host;
   c) creating a website, having at least one information page, said at least one information page having a first display and a second display;
   d) displaying said stream of images on said first display;
   e) taking a fixed image of said location on a clear day; and
   f) displaying said fixed image on said second display simultaneously with said first display.

13. The method of claim 12, wherein said website further includes a home page displaying a list of remote locations; a means for selecting a particular remote location from said list, and a plurality of information pages, wherein each of said plurality of information pages having a first display and a second display, further comprising the steps of:
   a) selecting a particular remote location from said list;
   b) displaying said stream of images of said particular remote location from said list on said first display; and
   c) displaying a fixed image of said particular remote location, said fixed image being taken on a clear day at said particular remote location, simultaneously with said stream of images on said first display, on second display.

14. The method of claim 13 further comprising the steps of:
   a) selecting a beginning location;
   b) selecting a destination location;
   d) accessing said website;
   e) displaying an information page for said beginning location; and
   f) displaying an information page for said destination location.

15. The method of claim 14 further comprising the steps of:
   a) designating a route between said beginning location and said destination location, said route including a number of discrete intermediate locations;
   b) displaying an information page for one of said number of discrete intermediate locations; and
   c) repeating step b for all other discrete intermediate locations on said route.

16. The method of claim 15 further comprising the step of printing an image of said information page for each of said number of discrete intermediate locations and said destination location.

17. The method of claim 15 wherein the step of accessing said website is performed in an airplane in flight along said route.

18. The method of claim 12 wherein the step of displaying said stream of images on said first display further includes the step of displaying a plurality of annotations displayed simultaneously with said stream of images.

19. The system of claim 18 wherein said plurality of annotations includes:
   a) a date and time at which the stream of images were created;
   b) wind direction in degrees;
   c) wind speed in knots;
   d) temperature;
   e) dew point;
   f) altimeter setting;
   g) measured ceiling; and
   h) measured visibility.

20. The method of claim 12 wherein the step of displaying said fixed image on said second display simultaneously with said first display further includes the step of displaying a plurality of annotations displayed simultaneously with said stream of images.

21. The method of claim 20 wherein said plurality of annotations includes:
   a) a magnetic azimuth corresponding to a magnetic direction aligned with a left side of the image;
   b) a magnetic azimuth corresponding to a magnetic direction aligned with a right side of the image;
   c) mean sea level (MSL) altitudes of geographical features on a horizon;
   d) above ground level altitudes of geographical features on the horizon;
   e) a distance from said geographical features from said means for obtaining a stream of images; and
   f) names of said geographical features on the horizon.

22. The method of claim 21 wherein said plurality of annotations further includes:
   a) a description of man-made structures shown in the fixed image;
   b) a distance from said man-made structures to means for producing a stream of images;
   c) names of said man-made structures;
   e) a magnetic bearing and distance to man-made cities; and
   f) a plurality of magnetic bearing and distance geographical features that are not in view in the fixed image.

23. The method of claim 22 wherein said plurality of annotations further include:
   a) a windsock at an airport;
   b) an extent of a runway at an airport;
   c) a parking apron and taxiways at an airport; and
   d) a snow stake to indicate a depth of snow at an airport.

* * * * *